(12) United States Patent
Scharmüller

(10) Patent No.: US 7,618,052 B2
(45) Date of Patent: Nov. 17, 2009

(54) HIGH-LOAD DRAWBAR EYE

(76) Inventor: Josef Scharmüller, Saxigen 14, 4892 Fornach (AT)

( * ) Notice: Subject to any disclaimer, the term of this patent is extended or adjusted under 35 U.S.C. 154(b) by 417 days.

(21) Appl. No.: 10/595,651

(22) PCT Filed: Oct. 22, 2004

(86) PCT No.: PCT/AT2004/000365

§ 371 (c)(1),
(2), (4) Date: May 2, 2006

(87) PCT Pub. No.: WO2005/044601

PCT Pub. Date: May 19, 2005

(65) Prior Publication Data

US 2007/0138764 A1    Jun. 21, 2007

(30) Foreign Application Priority Data

Nov. 7, 2003   (AT) .............................. A 1793/2003

(51) Int. Cl.
*B60D 1/06* (2006.01)
(52) U.S. Cl. ....................................... 280/513; 280/511
(58) Field of Classification Search ................. 280/511, 280/513
See application file for complete search history.

(56) References Cited

U.S. PATENT DOCUMENTS

| | | | | |
|---|---|---|---|---|
| 2,078,851 A | | 4/1937 | Hovey | |
| 2,237,031 A | * | 4/1941 | Gilmore | 280/513 |
| 2,326,466 A | * | 8/1943 | Kitterman | 280/511 |
| 2,377,368 A | * | 6/1945 | Polstra | 280/513 |
| 2,515,856 A | | 7/1950 | Brougher | |
| 3,104,894 A | * | 9/1963 | Henry | 280/513 |
| 4,778,196 A | * | 10/1988 | Spoliansky | 280/512 |
| 5,150,911 A | | 9/1992 | Williams | |
| 5,154,249 A | | 10/1992 | Yardley | |
| 6,588,790 B2 | * | 7/2003 | Hall | 280/513 |

FOREIGN PATENT DOCUMENTS

| | | |
|---|---|---|
| DE | 1 894 999 U | 6/1964 |
| FR | 816 286 A | 8/1937 |
| FR | 1 548 623 A | 12/1988 |
| GB | 834 069 A | 5/1960 |
| NL | 1 013 779 C2 | 6/2001 |

* cited by examiner

*Primary Examiner*—Lesley D Morris
*Assistant Examiner*—Michael R Stabley
(74) *Attorney, Agent, or Firm*—Henry M. Feiereisen; Ursula B. Day

(57) ABSTRACT

A high-load drawbar eye (1) with a hitch socket (2) which is open about the rim for receiving a matching hitch ball (7), a hitch arm (3) and a hitch flange (4), includes a hold-down device (5) which cooperates with the hitch socket (2), for realizing a compact hitch connection with a hitch apparatus having a hitch ball.

10 Claims, 6 Drawing Sheets

HIGH-LOAD DRAWBAR EYE

BACKGROUND OF THE INVENTION

The invention relates to a high-load drawbar eye with a hitch socket that is open about the rim for receiving a matching hitch ball, a hitch arm and a hitch flange.

Such high-load drawbar eyes are used, in particular, in agriculture and in trucks and are able to support a load of at least two tons. The high-load drawbar eyes are typically formed massive and are secured on the hitch ball by a hold-down device which is arranged on a hitch above the hitch ball.

SUMMARY OF THE INVENTION

It is an object of the invention to modify a high-load drawbar eye of the aforedescribed type so as to provide a compact hitch connection with the hitch ball, which is easy to handle and attains the greatest possible ground clearance below the high-load drawbar eye.

This is attained in accordance with the invention by providing a hold-down device that cooperates with the hitch socket.

This approach advantageously eliminates on the hitch the need for structures for a hold-down device and its operation, making it possible to significantly decrease the overall dimensions of the hitch. As a consequence, other fixtures in addition to the hitch can be mounted on the rear side of the towing vehicle, so that the high-load drawbar eye according to the invention can have many different applications. In towing vehicles having a power take-off shaft, with the hitch ball arranged below the shaft, the hitch ball can be mounted closer to the power take-off shaft, when using the high-load drawbar eye according to the invention, so as to provide a greatest possible ground clearance.

According to a development of the invention, the hold-down device, as seen in the operating position, is movably supported on the underside of the hitch arm, so that the additional installation height of the high-load drawbar eye required for the hold-down device can be kept small and a stable guide for the hold-down device can be designed.

According to another embodiment of the invention, the hold-down device can be operated by an actuating apparatus. The hold-down device can be easily and reliably operated with the actuating apparatus.

In this context, according to another improvement of the invention, the actuating apparatus can include a toggle joint. A great closing force can be applied upon the hold-down device with the toggle joint to thereby realize a high reliability and safety of the high-load drawbar eye according to the invention.

According to another embodiment of the invention, the actuating apparatus can include an eccentric lever so that the number of required components of the high-load drawbar eye can be kept small. These components can have a simple geometry and can therefore be manufactured easily and inexpensively.

According to an improvement of the invention, the actuating apparatus can include a manual lever. The hitching operation can be accomplished easily and quickly by using the manual lever, without requiring additional auxiliary components.

According to another design of the invention, the actuating apparatus can include a pneumatic and/or hydraulic cylinder. In particular, if a pneumatic and/or hydraulic system is already installed on the trailer, the hold-down device can be operated easily and quickly with this design, utilizing the pneumatic and/or hydraulic system.

According to another configuration of the invention, the hold-down device can have a fork with a semicircular shape. The fork can encircle a partial region of the hitch ball to secure the hitch ball in the hitch socket, so that the hold-down device has a simple shape.

In this context in accordance with an improvement of the invention, a collar matching the shape of the fork can be formed on the hitch socket. The hitch ball can be particularly securely held by the high-load drawbar eye by employing the collar and the fork, so that the high-load drawbar eye according to the invention can be subjected reliably to a high-load.

According to further configuration of the invention, recesses can be provided on the collar, and projections matching the recesses can be arranged on the fork, so as to realize a particularly high negative support load that can be absorbed by the high-load drawbar eye.

According to further configuration of the invention, the hitch socket can be essentially shaped as a hemisphere, and the hold-down device can be arranged in the region of the greatest diameter of the hitch socket. With this configuration, the hitch ball can be reliably and securely received by the high-load drawbar eye according to the invention.

In accordance with a further configuration of the invention, the part of the hitch ball that can be received by the hitch socket and the hold-down device is greater than a hemisphere having the diameter of the hitch ball, to thereby attain a flat contact of the receivable part of the hitch ball. This results in a particularly large contact surface between the high-load drawbar eye and the hitch ball, so that the presence of stress is kept low and the high-load drawbar eye according to the invention can be subjected to a high load.

According to an improvement of the invention, the center axis of the hitch socket can define an angle other than 90° with the longitudinal axis of the hitch arm, wherein this angle is preferably in a range between approximately 50° and approximately 80°, in particular in a range between 60° and 70°. The presence of the angle, the area under pressure can be increased as a trailer or the like is being pulled, so as to increase a load carrying capacity and stability of the high-load drawbar eye according to the invention.

BRIEF DESCRIPTION OF THE DRAWING

Embodiments of the invention will be described in more detail with reference to the attached drawings, in which.

DETAILED DESCRIPTION OF PREFERRED EMBODIMENTS

Figure 1:
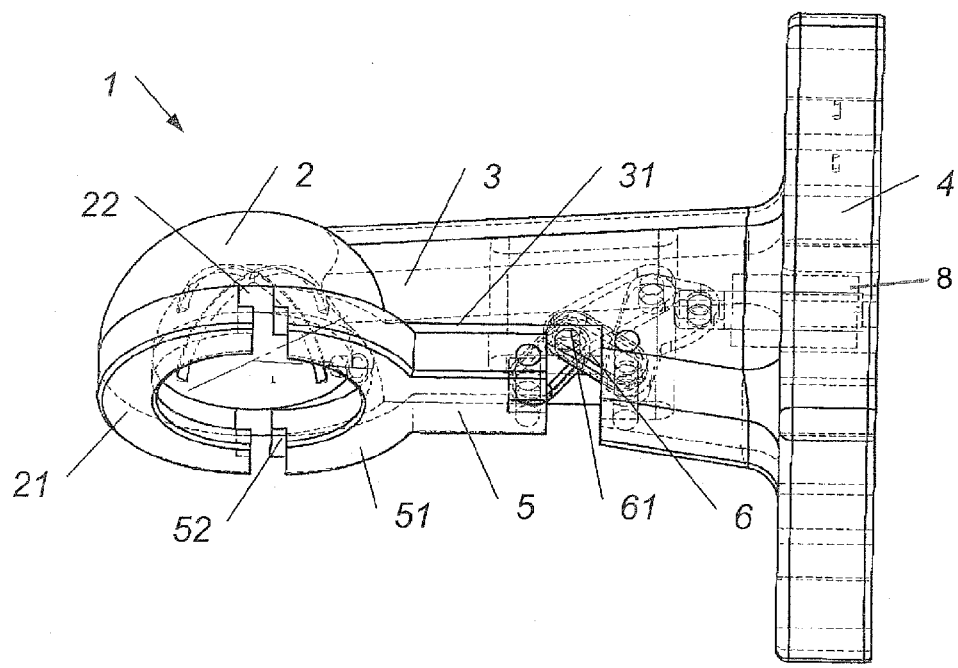
FIGS. 1, 3, 5, 7, 9 and 11 show angled perspective views of embodiments of a high-load drawbar eye according to the invention, with open hold-down device.
Figure 2:
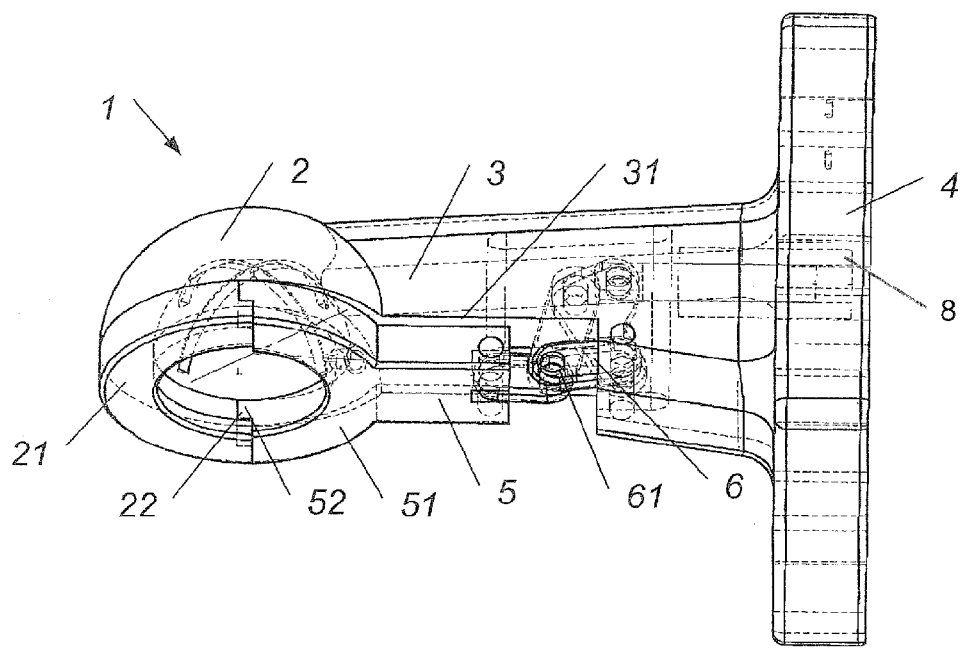
FIGS. 2, 4, 6, 8, 10 and 12 show angled views of the high-load drawbar eye according to FIGS. 1, 3, 5, 7, 9 and 11 with closed hold-down device.
Figure 3:
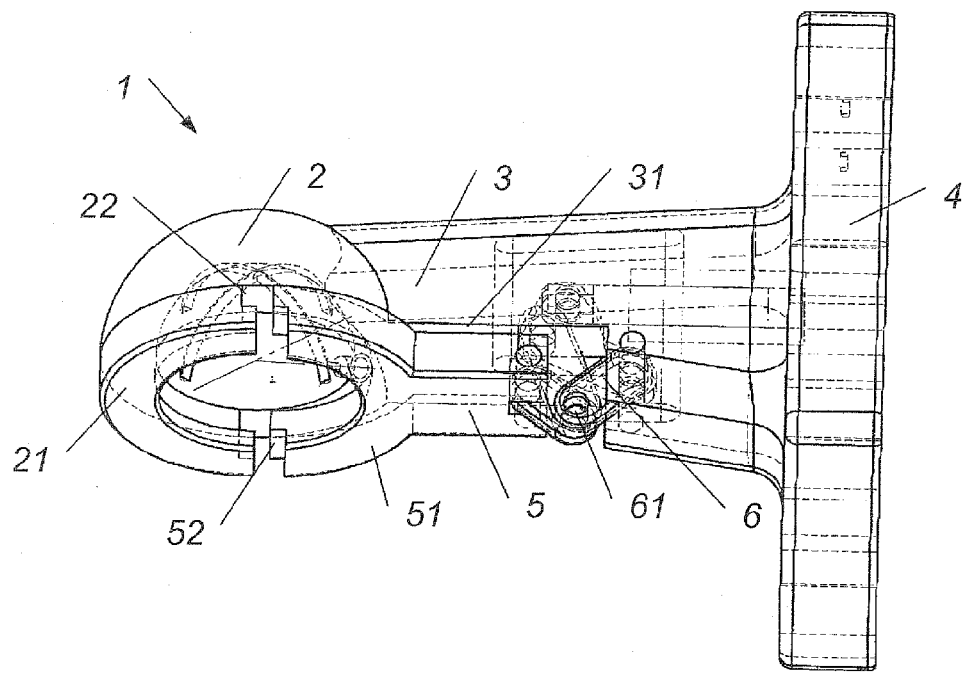
Figure 4:
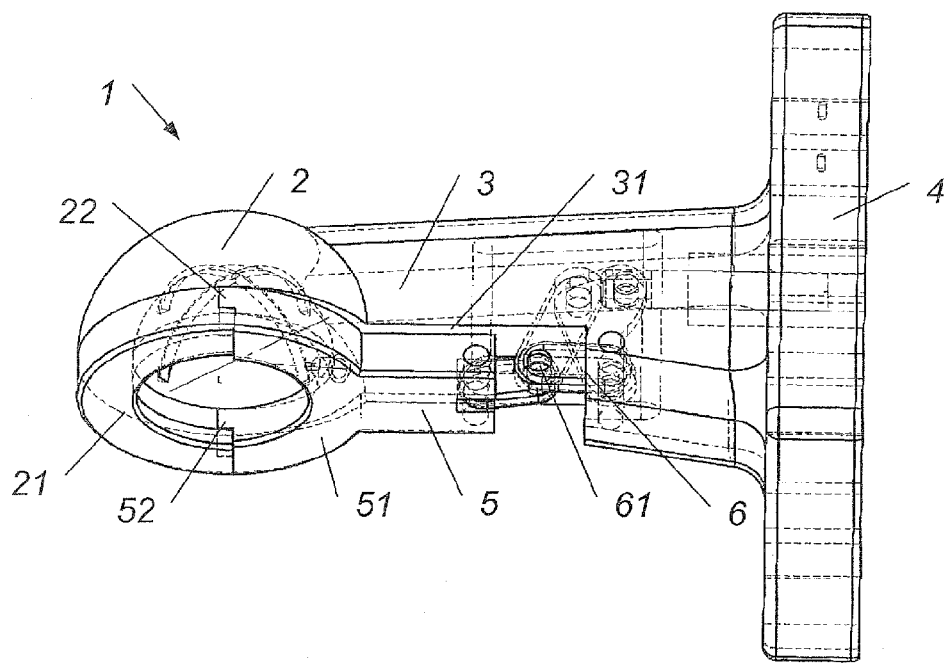
Figure 5:
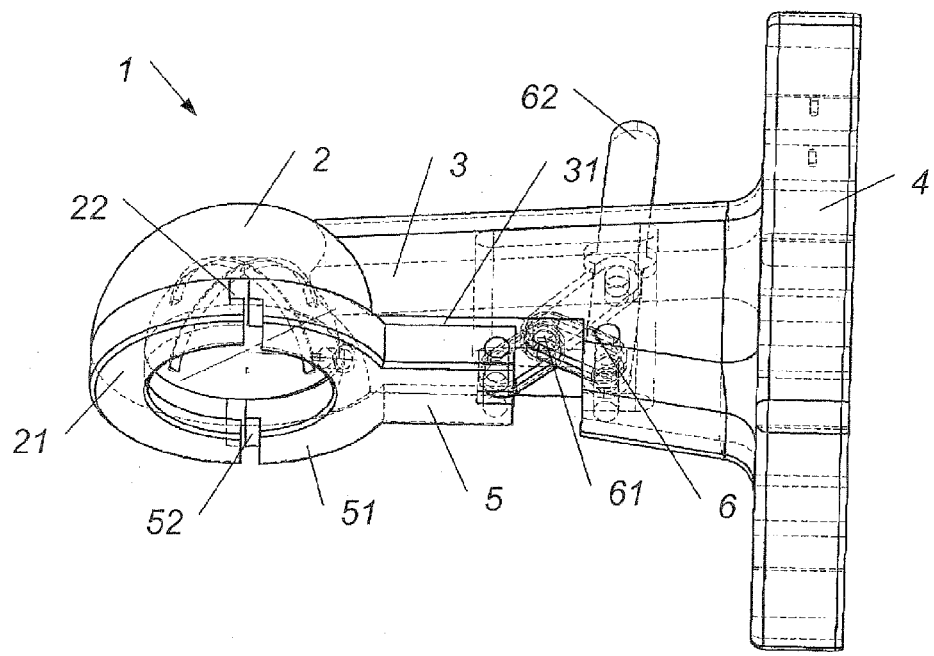
Figure 6:
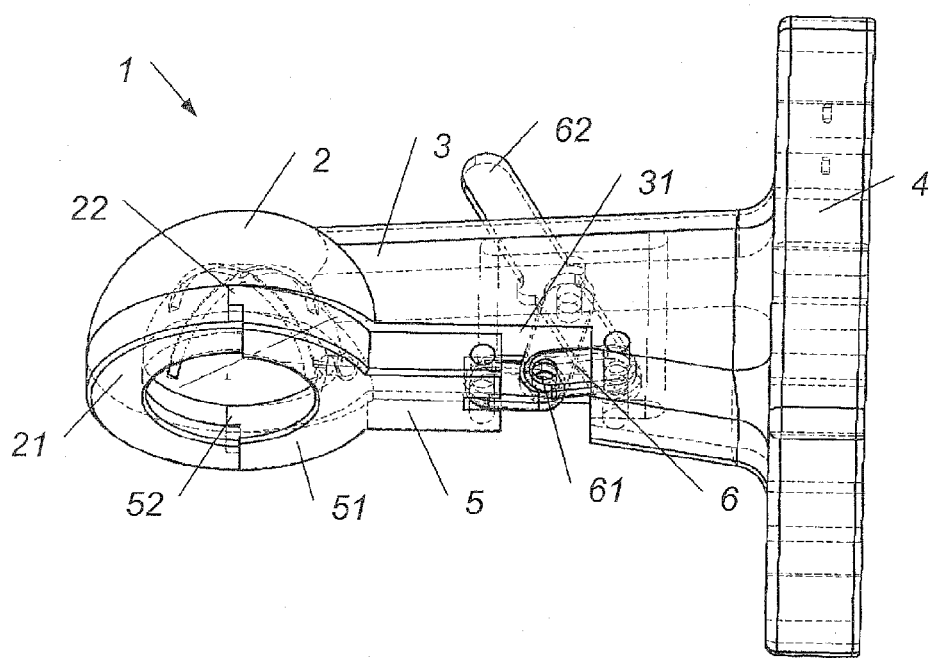
Figure 7:
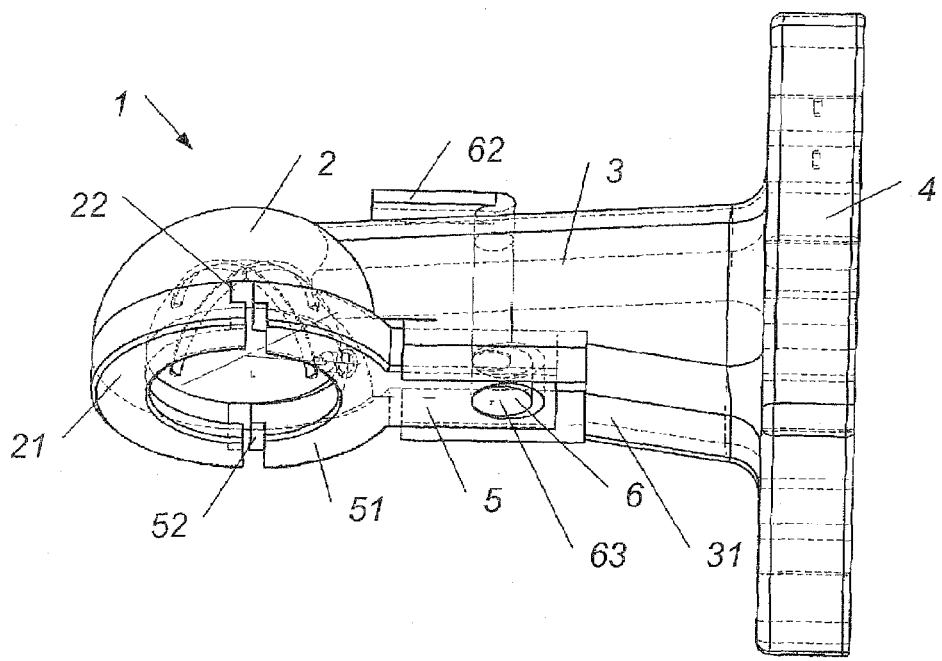
Figure 8:
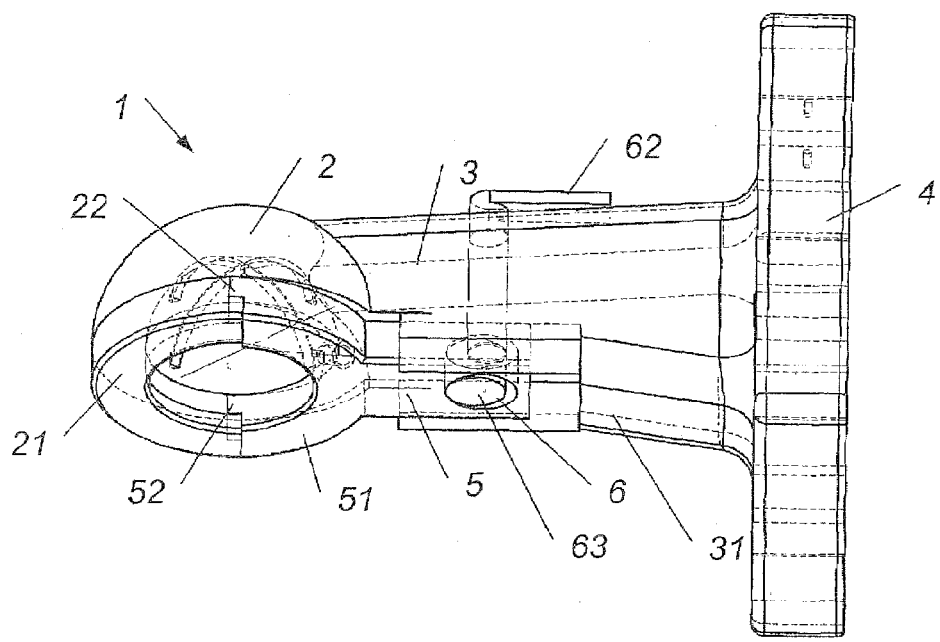
Figure 9:
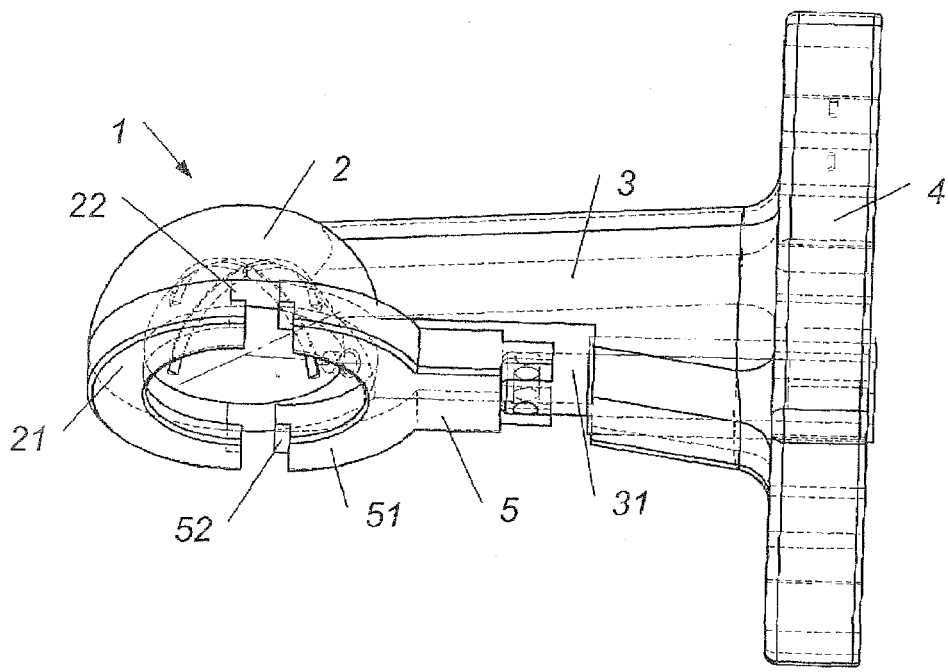
Figure 10:
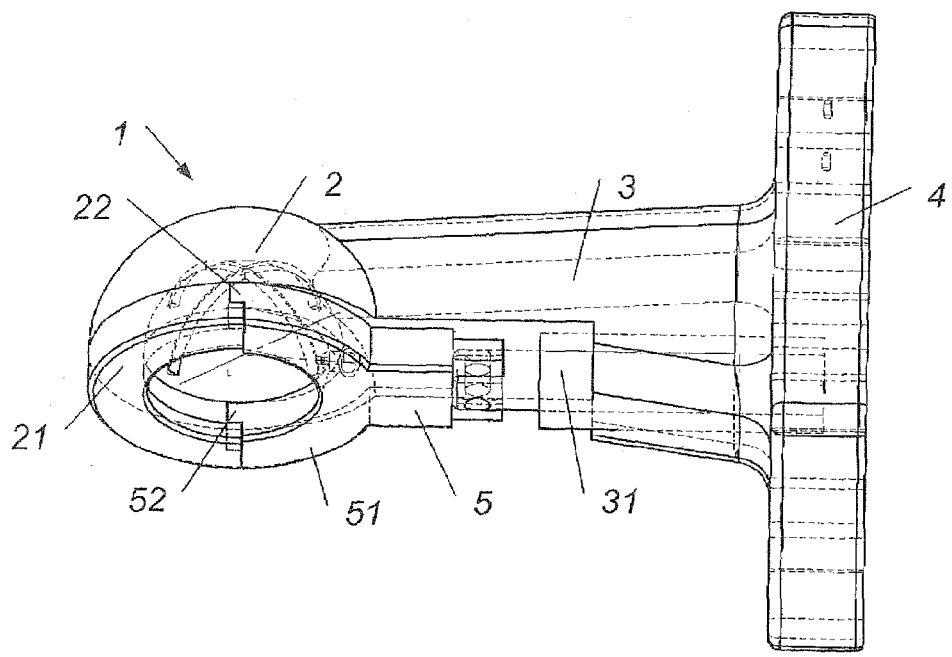

FIGS. 1 to 12 show embodiments of a high-load drawbar eye 1 according to the invention with a hitch socket 2 that is open about the rim for receiving a matching hitch ball 7, a hitch arm 3 and a hitch flange 4.

The high-load drawbar eye 1 is used mainly with agricultural machines and trucks, but is applicable for any type of trailers that requires transfer of large loads via the hitch. Loads in excess of two tons can be supported by the high-load drawbar eye 1. To transmit the required forces, high-load drawbar eyes 1 include the hitch flange 4 and a massive hitch arm 3.

The high-load drawbar eye 1 can be placed on a hitch ball 7 and then held on the hitch ball 7 with a hold-down device 5. The high-load drawbar eye 1 according to the invention includes hereby the hold-down device 7 which cooperates with the hitch ball 2.

Compared to conventional hitches, there is no need to provide a hold-down device on the hitch above the hitch ball 7, so that the overall height of the hitch can be reduced substantially. The high-load drawbar eye 1 according to the invention therefore achieves a significantly greater ground clearance in comparison with conventional hitches. In addition, attachment options on the rear side of a towing vehicle for other devices can be designed more flexible and more liberal.

It appears beneficial to movable support the hold-down device 5, as seen in the operating position, on the bottom side 31 of the hitch arm 3. In particular, the hold-down device can hereby be guided in a guide which extends essentially parallel to the longitudinal axis 35 of the hitch arm 3. The additional installation height of the high-load drawbar eye 1 according to the invention as a consequence of the hold-down device 5 can be kept small.

The hold-down device 5 can be operated by means of an actuating apparatus 6, which can be arranged, in particular, in the interior of the hitch arm 3, thereby protecting the actuating apparatus 6 from the environment, in particular from contamination.

High closing forces can be readily applied to the hold-down device 5 by including in the actuating apparatus 6 a toggle joint 61 so as to realize a particularly secure retention of the hitch ball 7.

Only very few and simple components are required if the actuating apparatus 6 is formed with an eccentric lever 63, so that the high-load drawbar eye 1 can be manufactured in a simple and cost-efficient manner.

Hitching can be accomplished without the use of additional tools by including in the actuating apparatus 6 a manual lever 62 so that the high-load drawbar eye 1 can be employed in many applications in particular.

If the trailer is equipped with a pneumatic and/or hydraulic system, then this system can advantageously be employed by including in the actuating apparatus 6 a pneumatic and/or hydraulic cylinder 8.

All embodiments of the actuating apparatus 6 can include safety systems which effectively prevent displacement of the hold-down device 5 in the hitched state.

The hold-down device 5 depicted in FIGS. 1 to 12 includes a semicircular fork 51. A collar 21 shaped complementary to the fork 51 is formed on the hitch socket 2. The collar 21 and the fork 51 can guide the hitch socket 2 along the entire circumference of the hitch ball 7.

The portion of the hitch ball 7 that is received by the hitch socket 2 and the hold-down device 5 can be made greater than a hemisphere having the diameter of the hitch ball 7, to thereby realize a substantially flat contact of the received portion of the hitch ball. This configuration effectively prevents the high-load drawbar eye 1 according to the invention from being lifted off the hitch ball 7. Moreover, a particularly firm seat of the hitch ball 7 in the hitch socket 2 can be implemented.

The hitch socket 2 is essentially of hemispherical shape, and the hold-down device 5 is arranged in a region of the greatest diameter of the hitch socket 2. The hold-down device 5 can be displaced, allowing the hitch ball 7 to be easily moved in and/or out of the hitch socket 2.

Recesses 22 can be provided on the collar 21, and matching projections 52 can be provided on the fork 51, so as to ensure a sufficiently negative support load in the engaged state, with the negative support load being jointly received by the collar 21 and the hold-down device 5.

Figure 11:
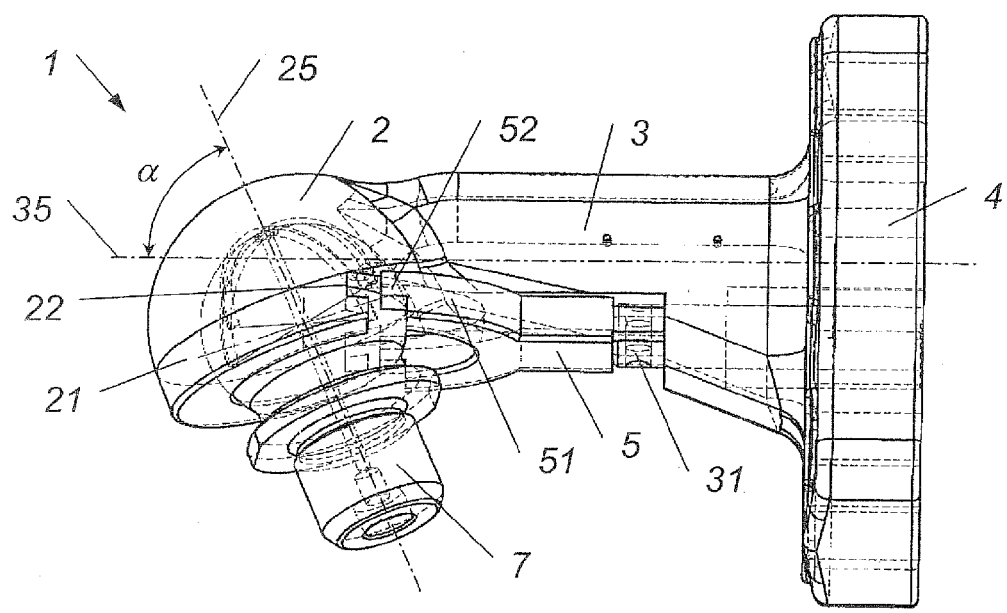
Figure 12:
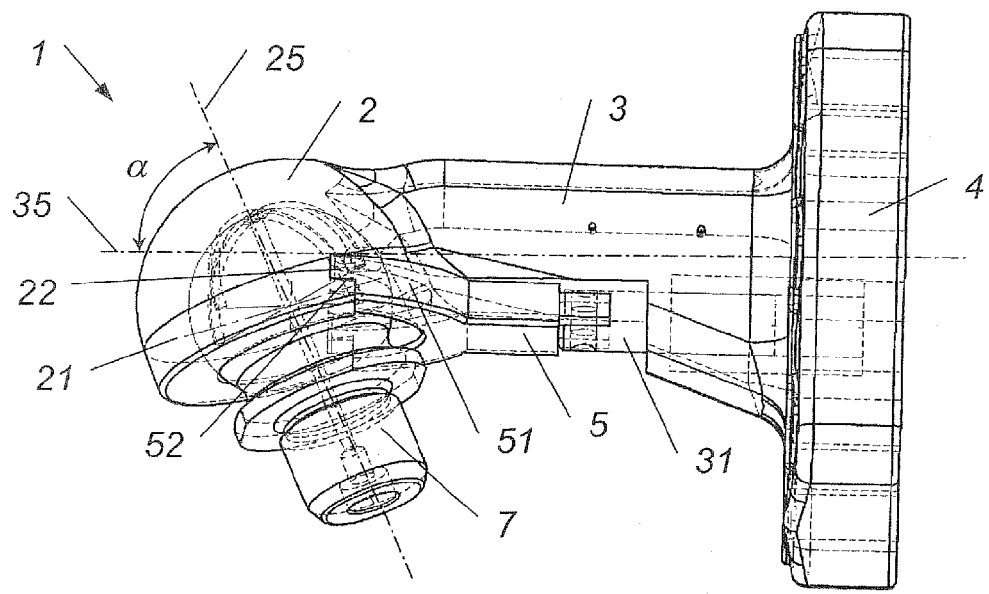

According to the embodiment depicted in FIGS. 11 and 12, the center axis 25 of the hitch socket 2 can define with the longitudinal axis 35 of the hitch arm 3 an angle $\alpha$ different from 90°, whereby the angle $\alpha$ is preferably in a range between approximately 50° and approximately 80°, in particular in a range between approximately 60° and 70°.

If an inclined hitch socket 2 is used, the hitch ball 7 can also be mounted on the hitch at an angle, wherein the inclination can correspond to the inclination of the hitch ball 7 depicted in FIGS. 11 and 12. The hitch ball 7 is hereby inclined in the direction of the towing vehicle.

As a result of the inclined hitch socket 2, a particularly large contact surface with the hitch ball 7 can be achieved so that a greater negative support load can be received. The inclined hitch socket 2 also has a greater surface under pressure as the trailer is being pulled so that higher trailer loads can be pulled and/or smaller surface pressure can be realized.

In the high-load drawbar eye 1 according to the invention, the clearance between the hitch ball 7 and the hitch socket 2 can be kept small, so that impact shocks can be effectively eliminated and the operation is very quiet.

What is claimed is:

1. A high-load drawbar eye, comprising:
   a hitch flange for attachment to a towed vehicle;
   a hitch socket constructed to receive a matching hitch ball and having an open rim and defining a center axis, said hitch socket being substantially hemispherical in shape and defining a greatest diameter;
   a substantially semicircular collar formed along the open rim and having a diameter smaller than a greatest diameter of the hitch socket and further including two end sections, each end section having a recess formed therein;
   a hitch arm defining a longitudinal axis and connecting the hitch socket to the hitch flange; and
   a hold-down device movably attached to the hitch arm for movement along the longitudinal axis and including a semicircular fork engaging with the hitch socket, said semicircular fork having two end sections each end section having a projection formed thereon, with each projection interlocking with a corresponding opposing recess in the semicircular collar when the hitch ball is in engagement with the hitch socket.

2. The drawbar eye of claim 1, wherein the center axis and the longitudinal axis extend at an angle ranging between approximately 50° and approximately 80° relative to one another.

3. The drawbar eye of claim 2, wherein the angle ranges between 60° and 70°.

4. The drawbar eye of claim 1, wherein, as viewed in operating position, the hold-down device is movably supported on a bottom side of the hitch arm.

5. The drawbar eye of claim 1, further comprising an actuating apparatus for operating the hold-down device.

6. The drawbar eye of claim 5, wherein the actuating apparatus includes a toggle joint.

7. The drawbar eye of claim 5, wherein the actuating apparatus includes an eccentric lever.

8. The drawbar eye of claim 5, wherein the actuating apparatus includes a manual lever.

9. The drawbar eye of claim 5, wherein the actuating apparatus includes a pneumatically or hydraulically operated cylinder.

10. The drawbar eye of claim 1, wherein the hitch ball has a diameter and includes a portion which is constructed for reception by the hitch socket and the hold-down device, said portion being greater in size than a hemisphere sized to correspond to the diameter of the hitch ball, thereby realizing a substantially flat support area of the portion of the hitch ball by the hitch socket and the hold-down device.

* * * * *